C. BADER.
CLOSURE FOR PRESERVING JARS.
APPLICATION FILED MAR. 21, 1908.
No. 910,347.
Patented Jan. 19, 1909.
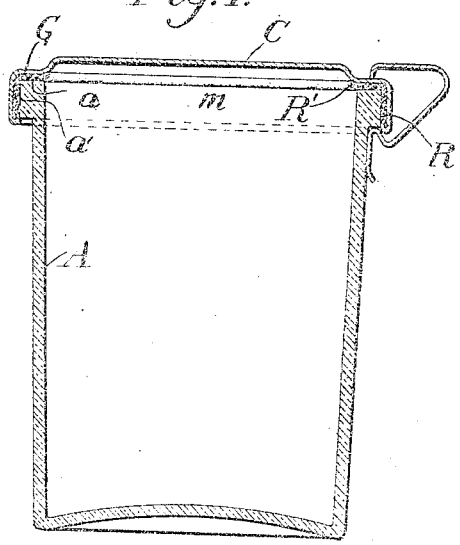
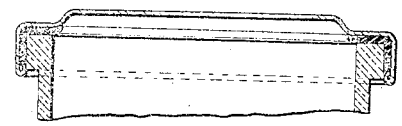
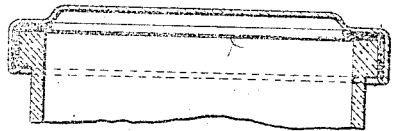
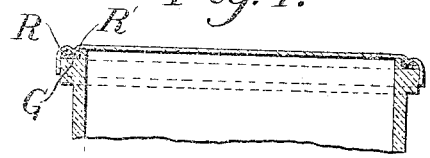
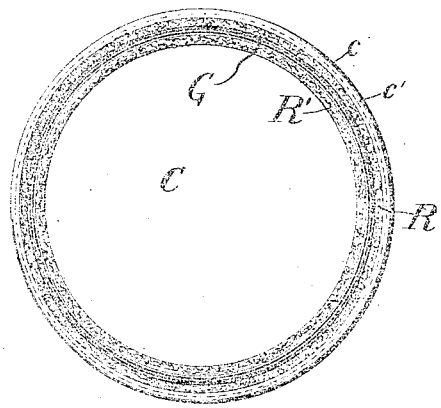
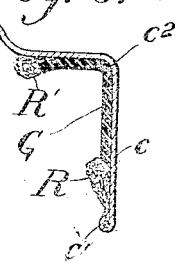
Witnesses
H. H. Lowenstein
James H. Marr
Inventor
Carl Bader
By Edward E. Clement
Attorney

UNITED STATES PATENT OFFICE.

CARL BADER, OF CHICAGO, ILLINOIS.

CLOSURE FOR PRESERVING-JARS.

No. 910,347.

Specification of Letters Patent.

Patented Jan. 19, 1909.

Application filed March 21, 1908. Serial No. 422,491.

*To all whom it may concern:*

Be it known that I, CARL BADER, a citizen of the United States, residing at Chicago, in the county of Cook and State of Illinois, have invented certain new and useful Improvements in Closures for Preserving-Jars, of which the following is a specification, reference being had therein to the accompanying drawing.
My invention relates to the art of preserving perishable products, and has for its object the production of a closure for preserving jars and other vessels which will not only provide a tight seal but will positively exclude all bacteria or micro-organisms which are productive of fermentation, mold, etc.

Briefly stated, my invention comprises a vessel with an opening having a sealing surface contiguous thereto, a cap fitted to said opening, a gasket interposed between the cap and sealing surface, and one or more rings of cotton secured to the cap and adapted when properly sterilized to protect the seal from the entrance of any micro-organisms or other injurious agencies.

My invention is illustrated in the accompanying drawings wherein—

Figure 1 is a vertical section of a jar having its cap provided with my germ-proof seal.
Figs. 2, 3 and 4 show modifications. Fig. 5 is a bottom plan view of the cap shown in Fig. 1, removed from the jar. Fig. 6 is a detailed sectional view on an enlarged scale showing the mode of attaching the gasket and cotton rings.

Referring to Fig. 1, A is the jar having its mouth *m* covered by the cap C. Around the mouth of the jar the edges are molded or ground so as to produce sealing surfaces *a* and *a'*, between which and the flanges of the cap I place the gasket G of rubber or its equivalent, and the two cotton rings R and R'. The method of securing these parts is best shown in Fig. 6. The cap C is provided with a flange *c*, the edge of which is bent over inwardly at *c'* so as to return upon itself all around the periphery of the cap. The gasket G if composed of rubber or fibrous material impregnated with rubber, may be rendered sufficiently adhesive by heating to retain its position in the angle *c²* of the cap, or if not self-adhesive, then it is secured in position by means of suitable cement. The cotton ring R is laid around beneath the lower edge of the gasket and is held in that position by the returned edge *c'*, which is forcibly clamped upon it all around. The other ring R' is similarly laid around the upper edge of the gasket and is held in that position by extending said upper edge of the gasket over a portion of the ring and causing it to adhere thereto either by softening its own substance or by means of cement.

In using the closure thus described, the cap and rings are sterilized by being dipped in boiling water or exposed to the action of steam for a moment, before being placed in position. Suitable pressure being exerted upon the cap, the gasket G is compressed against the surfaces *a a'* of the jar, and the cotton rings R R' are brought into the most intimate relation with these surfaces. The seal thus produced I have found to be absolutely impassable for bacteria, consequently even though the pressure on the gasket be not uniform and some slight seepage or entrance of air may result, nevertheless the contents of the jar receive protection, since the principal cause of deterioration in canned or preserved products is the access of bacteria thereto from the air. For example, in the case of canned fruit, the can may be tight, sealed by a rubber gasket under pressure, and yet deteriorate in a relatively short time, owing to the fact that the slightest infinitesimal leak of the gasket which allows a little air to seep through, permits entrance of bacteria with the air. It should be also be noted that there is a tendency for the sulfur in the rubber of the gasket to form sulfureted hydrogen. My cotton rings prevent this as well as the entrance of micro-organisms, the inner ring R' obstructing the passage of hot fumes from the fruit to the gasket.

It is estimated that from 15% to 20% of the fruit and vegetables preserved each year is lost because of defective seals of the jars or sulfureted hydrogen due to action of the hot fumes on the sulfur in the rubber. While this loss is distributed among the mechanical canners who operate commercially on a large scale, it does not cover the enormous aggregate losses of housewives who put up fruit and vegetables for their own family consumption, and it would perhaps not be too much to say that 25 per cent. of the annual preserving in the country is lost. This can be saved by excluding the micro-organisms to which fermentation, mold and the like are due. I have demonstrated that cherries, peas, and the like, which under ordinary conditions would have mold formed on the top in a few days, can be kept indefinitely with my cotton rings properly sterilized. In such demonstrations I have employed the simplest means for producing the seal, simply bringing the product to a boil so as to sterilize it, and dipping the cap into hot water for the same purpose. The escape of steam and gases due to the inward heat is sufficient to form a partial vacuum within the jar when cool, so that atmospheric pressure may be relied upon to keep the cap in position and to compress the gasket.

In Figs. 2 and 3 modifications of the gasket are shown, which permit the enlargement of one of the rings, preferably the outer one R, as this is of the greatest importance as a protection against atmospheric organisms.

In Fig. 4 I have shown the cap resting upon a horizontal sealing surface provided with a shoulder around which the gasket is stretched, the cotton being provided inside and outside thereof as before. The clamping effect in this case is due to an annular depression inside of the edge of the cap.

I am quite well aware that it has long been known to scientists that cotton in the loose and fibrous state is impervious to germs and micro-organisms of various kinds; but I believe I am the first to practically apply this knowledge to jar closures.

Many changes and modifications may be made as to shape and dimensions of the several parts I have described without departing from the spirit of the invention and it should be definitely understood that all such changes are contemplated by me as within the scope and purview of my claims.

Having thus described my invention what I claim and desire to secure by Letters Patent is—

1. A jar closure comprising a cap, a gasket therefor, and germ-proof means attached to the cap around said gasket for preventing the entrance of bacteria beneath the same, substantially as described.

2. A jar closure comprising a cap, an elastic gasket secured around and contiguous to the periphery of said cap, and a cotton ring secured around said periphery outside of the gasket, substantially as described.

3. A jar closure comprising a cap, an elastic gasket secured around and contiguous to the periphery thereof, and two cotton rings, one secured around the outer edge of said gasket and the other secured around the inner edge thereof, whereby the passage of injurious agencies from within and without is prevented, substantially as described.

4. In combination, a jar having an opening and a sealing surface contiguous thereto, a cap shaped to cover the opening a gasket carried by the cap and adapted to be compressed upon said sealing surface when the cap is in position, and a cotton ring secured upon the edge of the cap outside of said gasket and adapted to be compressed between the cap and the jar to exclude bacteria therefrom, substantially as described.

5. In combination, a jar having an opening and a sealing surface contiguous thereto, a cap shaped to cover said opening and having an inturned clamping edge, a gasket coöperating with the cap and sealing surface, and a cotton ring clamped around and beneath said edge of the cap outside of the gasket, in position to be compressed between the cap and jar, substantially as described.

6. In combination, a jar having an opening and a sealing surface contiguous thereto, a cap shaped to cover said opening, a gasket coöperating with the cap and the sealing surface to produce a tight seal, and a cotton ring secured upon the cap around the inner edge of said gasket so as to be compressed between the cap and sealing surface when the cap is in position, substantially as described.

7. In combination, a jar having an opening, a cap shaped to cover said opening, a gasket secured to the cap, and two cotton rings, one clamped within the outside edge of the cap, and the other secured beneath the inside edge of the gasket, whereby a seal is produced for the jar that will exclude bacteria and prevent chemical action upon the gasket, substantially as described.

In testimony whereof I affix my signature in presence of two witnesses.

CARL BADER.

Witnesses:
Jos. G. Carey,
Mae Klidel.